W. L. RICHARDS.
ELECTRIC RELAY.
APPLICATION FILED FEB. 8, 1913.

1,103,688.

Patented July 14, 1914.

Witnesses:
W. F. Hoffman
O. D. M. Guthe

Inventor:
Wilton L. Richards.
by John G. Roberts
Att'y.

UNITED STATES PATENT OFFICE.

WILTON LANCASTER RICHARDS, OF EAST ORANGE, NEW JERSEY, ASSIGNOR TO WESTERN ELECTRIC COMPANY, OF NEW YORK, N. Y., A CORPORATION OF ILLINOIS.

ELECTRIC RELAY.

1,103,688.

Specification of Letters Patent.

Patented July 14, 1914.

Application filed February 8, 1913. Serial No. 747,057.

*To all whom it may concern:*

Be it known that I, WILTON LANCASTER RICHARDS, a citizen of the United States, and a resident of East Orange, in the county of Essex and the State of New Jersey, have invented a new and useful Improvement in Electric Relays, of which the following is a full, clear, concise, and exact description.

This invention relates to devices for amplifying feeble impulses of electrical energy and is particularly applicable for use in connection with relays of the gaseous type such, for instance, as disclosed in Letters Patent Nos. 841,387, January 15, 1907 and 879,532, February 18, 1908, granted to Lee De Forest.

It has been found by experiment that relays of the general type in which a gaseous conductor is included in the amplifying circuit will operate satisfactorily only on small amounts of incoming energy. When large amounts of incoming energy such, for instance, as are encountered in ordinary telephone systems, are impressed on such relays, the relay becomes inert and ceases to operate.

It is an object of this invention to overcome this defect, and incidentally to improve the general operation of such relays.

The above mentioned objects are obtained in this invention by the provision of an alternative or shunt path for the energy normally passing through the gaseous conductor. This shunt or path is preferably of high resistance and as applied in connection with the specific device disclosed herein, is connected across the grid shaped electrode and the plate electrode, thus forming a high resistance shunt around the gaseous conductor included between such electrodes.

Figure 1:
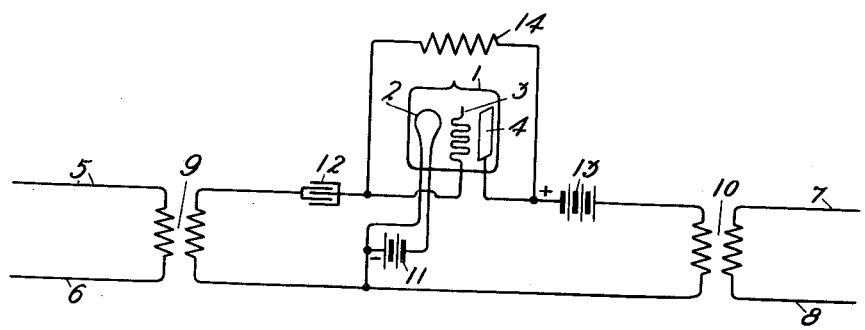
Figure 2:
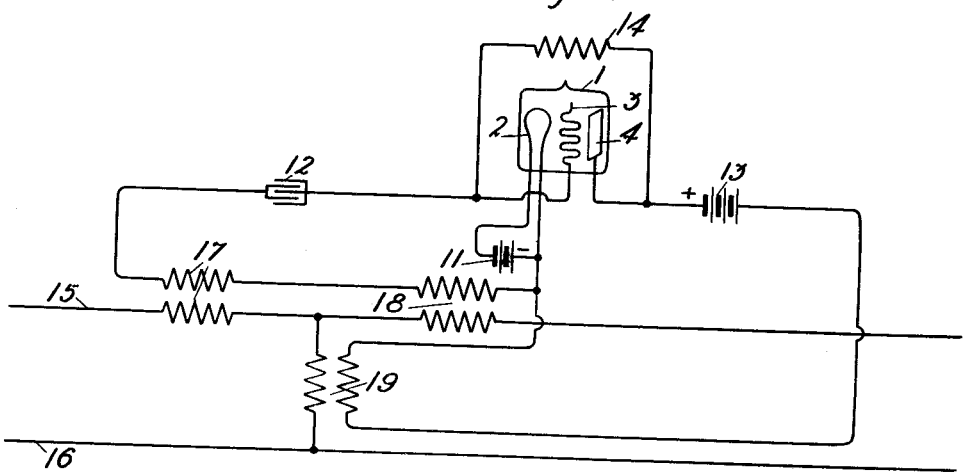

In the accompanying drawings,—Figure 1 is a diagram of the system when used as a one-way relay, and Fig. 2 is a similar diagram showing the connections for a two-way relay.

The amplifying element shown is substantially the same as the device disclosed in Patent No. 879,532 above referred to, and consists of an evacuated vessel 1 in which are sealed a carbon, tantalum or other suitable filament 2, a conducting member 3, which may be grid shaped as shown, and a conducting plate 4. This device is well known in the art and is termed an "audion" and, because of the grid-shaped element, is also sometimes known as the "grid audion." The audion as shown in the drawings is connected up so as to function as a telephone relay. For instance, in Fig. 1 in which a one-way circuit is shown, the incoming energy or energy to be amplified is impressed on the circuit 5, 6 and the outgoing or amplified energy on the circuit 7, 8. The incoming circuit is inductively connected to the relay circuit proper by means of a transformer 9, and the outgoing circuit by means of the transformer 10.

The filament 2 is connected across a source of potential 11 of sufficient magnitude to maintain said filament in a state of incandescence. The filament 2, the transformer 9, the condenser 12 and the grid element 3 are connected in a circuit, which for convenience may be termed the incoming relay circuit. The plate 4, source of potential 13, transformer 10 and the filament 2 are connected in a circuit that may be termed the outgoing relay circuit. Thus far the device and circuits are substantially the same as those shown in Patent No. 879,532 to which patent reference may be had for further description and for the operation of the device.

It has been found experimentally that with the connections shown in the Patent No. 879,532, when energies of considerable magnitude, such, for instance, as are encountered in ordinary telephone systems, are impressed upon the incoming circuits, there appears a bluish arc like discharge which apparently fills the entire vessel. This discharge appears to take place between the grid element 3 and the plate 4. When this discharge is present the device becomes inert and ceases to function as an amplifier. For instance, when used as a telephone relay the transmission stops almost entirely when the discharge appears. It has also been found experimentally that if a leakage path or shunt is provided, for example, between the grid element 3 and the plate 4, the discharge disappears entirely and the audion is able to handle and to amplify energies of much greater magnitude than is possible without the provision of the leakage path. In the specific embodiment of the invention disclosed, the leakage path or shunt comprises a high resistance 14, preferably in the neighborhood of one megohm. This resistance, which may be either inductive or noninductive, is connected between the grid element 3 and the plate 4.

In Fig. 2 a two-way relay is shown, that is, with the connections shown in Fig. 2, the device will amplify energy regardless of the direction from which said energy is received. In this figure, 15 and 16 represent the two conductors of a telephone line. Transformers 17, 18 and 19 are employed to inductively connect the relay to the line. The incoming relay circuit in this case includes the filament 2, transformers 18 and 17, condenser 12 and grid element 3. The outgoing relay circuit includes the filament 2, transformer 19, source of potential 13 and the plate 4. As in the case of the one-way relay, a high resistance 14 is connected between the grid element 3 and the plate 4.

It is obvious that the improvement disclosed herein may be applied to any of the various types of audions and similar gaseous relays without the exercise of invention.

Having thus described my invention, I claim as new, and desire to secure by Letters Patent of the United States, the following:

1. An electric relay comprising an incoming circuit, an outgoing circuit including a gaseous conductor forming a part of each of said circuits, and a conductive leakage path connected to two points in said gaseous conductor.

2. An electric relay comprising an incoming circuit, an outgoing circuit including a gaseous conductor forming a part of each of said circuits, and a high resistance conductive leakage path connected to two points in said gaseous conductor.

3. An electric relay comprising an evacuated vessel, a heated member, a conducting member and a conducting plate sealed therein, an incoming circuit connected across said heated member and said conducting member, an outgoing circuit connected across said heated member and said conducting plate, and an additional metallic circuit connecting said conducting member and said plate.

4. An electric relay comprising an evacuated vessel, an incoming circuit, an outgoing circuit, a cathode common to said circuits and anodes individual to said circuits sealed in said vessel, and a shunt circuit including a high resistance connecting said anodes.

5. An electric relay comprising an evacuated vessel, a heated electrode, a grid shaped member and a plate sealed therein, an incoming circuit including said heated electrode, a condenser and said grid member; an outgoing circuit including said heated electrode, a source of potential and said plate; and a shunt circuit including said grid member and said plate.

6. In an electric relay, the combination with an audion, of a circuit including a resistance in shunt of two of the elements of said audion.

7. An electric relay, comprising an incoming and an outgoing circuit, a gaseous conductor interposed between such circuits, and a conductive shunt circuit connected around said gaseous conductor.

8. An electric relay, an incoming circuit, an outgoing circuit including a gaseous conductor forming a part of each of said circuits and a conductive leakage path connected in parallel with a part of said gaseous conductor.

9. An electric relay comprising an evacuated vessel, a heated member, a conducting member and a conducting plate sealed therein, and a conductive circuit connected to said conducting member and said plate.

In witness whereof, I hereunto subscribe my name this 6th day of February A. D., 1913.

WILTON LANCASTER RICHARDS.

Witnesses:
 WALTER F. HOFFMAN,
 C. D. M. GUTHE.